United States Patent [19]
Pölling

[11] Patent Number: 6,082,522
[45] Date of Patent: Jul. 4, 2000

[54] TILTING-CONVEYING ELEMENT FOR A SORTER-CONVEYER

[75] Inventor: Ludger Pölling, Wadersloh-Distedde, Germany

[73] Assignee: Bernhard Beumer Maschinenfabrik KG, Beckum, Germany

[21] Appl. No.: 08/962,713

[22] Filed: Nov. 3, 1997

[30] Foreign Application Priority Data

Nov. 5, 1996 [DE] Germany .......................... 196 45 587

[51] Int. Cl.[7] .................................................. B65G 47/46
[52] U.S. Cl. .................................................. 198/370.04
[58] Field of Search ........................... 198/370.01, 370.04

[56] References Cited

U.S. PATENT DOCUMENTS

| | | | |
|---|---|---|---|
| 3,463,298 | 8/1969 | Harrison | 198/370.04 |
| 5,301,790 | 4/1994 | Prydtz et al. | 198/370.04 X |
| 5,570,773 | 11/1996 | Bonnet | 198/370.04 |
| 5,653,326 | 8/1997 | Liedgens | 198/370.04 |

*Primary Examiner*—James R. Bidwell
*Attorney, Agent, or Firm*—Kenyon & Kenyon

[57] ABSTRACT

A tilting-conveying element for a sorter-conveyer (sorter) for sorting parcels, particularly luggage pieces, comprising an essentially planar carrying base, which can be tilted from its essentially horizontal normal position around a tilting shaft running essentially in its longitudinal direction (=conveying direction) to an at least slanted delivery position, and on each of whose longitudinal edges, running essentially in its longitudinal direction, a side wall is arranged, which forms a lateral limit stop in the normal position of the carrying base, at least one side wall being movably mounted relative to the carrying base on the tilting-conveying element such that it can be moved from its limit-stop position to a second position, in which it no longer protrudes over the upper side of the carrying base, so as to form a limit stop (FIG. 1).

12 Claims, 7 Drawing Sheets

TILTING-CONVEYING ELEMENT FOR A SORTER-CONVEYER

The invention relates to a tilting-conveying element for a sorter-conveyer (sorter) for sorting parcels, particularly luggage pieces, comprising essentially a plurality of identical tilting-conveying elements, which are arranged in series one behind the other, carried by a (continuous) guiding device, closed on itself, and which are capable of being operated [actuated] along the guiding device, each being joined by an articulated connection to an upstream and a downstream tilting-conveying element, the parcels to be sorted each being individually loaded at (at least) one delivery location onto a carrying base of a tilting-conveying element and unloaded again laterally (=transversely to the conveying direction) at a delivery location selected from a plurality of possible ones.

In this context, each tilting-conveying element has an essentially planar carrying base (mounted at its upper end) for receiving and supporting a parcel, which, for the purpose of laterally delivering the parcel supported by it at the respective preselected delivery location, can be tilted from an essentially horizontal normal position around a tilting shaft essentially running in its longitudinal direction (=conveying direction), to a slanted delivery position (and, after delivery of the parcel in question, capable of being returned to its normal position), and on each of whose longitudinal edges, running essentially in the conveying direction, a side wall is arranged, which, in the normal position of the carrying base, forms a lateral limit stop for the parcel supported by the carrying base.

While parcels are being sorted by means of a sorter, problems can arise when the parcels to be sorted protrude laterally during transport to the point that they extend over the carrying base of a conveying element. This sometimes occurs, for example, when the parcels to be sorted are pieces of luggage such as knapsacks, which have loose straps, belts, etc., or luggage pieces having various parts hanging out of them, which can get caught on various parts of the apparatus during sorting.

To avoid these difficulties, sorters are already designed as so-called container-conveyors, in which, before the parcels to be sorted are transferred to the sorter, they are each delivered into a container, which then together with the luggage piece or the like in question, constitutes a parcel to be sorted (see, for example, European Patent 0 456 297 B1). In the process, however, a substantial additional expense is incurred, especially since the empty containers must be returned from their destination locations (delivery locations) or from another sorter location to the location where they are loaded with the parcels.

Parcels to be sorted can also project laterally over the carrying base, in an undesirable way, in the horizontal curves of the sorting track if, in the process, a parcel slides by accelerating relative to the carrying base, which effect may be so pronounced that certain parcels may even fall from the sorter in the process.

Therefore, to also avoid these disadvantageous effects with certainty, the concept known from the above-mentioned container-conveyers has also already been taken up, namely, for the transport of the parcel, to arrange on each side a lateral boundary edge on the longitudinal edges of the carrying base, and on each longitudinal edge of the carrying base a fixed side wall to suitably limit the sliding of a parcel set on the carrying base. In the case of tilting-conveying elements of the species, however, which each time are emptied by means of a lateral tilting of the carrying base, these fixed side walls represent an obstruction and, therefore, can project upwards only relatively slightly above the upper side of the carrying base. As a result, in the normal position of the carrying base, the desired limit-stop effect is very limited. In particular, the effectiveness of these side walls as a lateral boundary edge for each parcel is extremely limited, so that even if lateral sliding during transport were to be limited in this way and the parcel did not slide off of the carrying base, nevertheless, portions of parcels often cannot be prevented from projecting laterally.

The present invention has the objective of improving the tilting-conveying element of the species described above particularly so that the side walls no longer hinder the regular delivery of a parcel to a delivery location, and so that the limit stop and boundary edge effectiveness of the side walls in the normal position of the carrying base is significantly improved (through a more or less arbitrarily large extension of the side walls above the upper side of the carrying base).

This object is achieved by the present invention in that at least one side wall is arranged on the tilting-conveying element so as to be movable relative to the carrying base, such that said side wall can be moved out of its limit-stop position, which is present in the normal position of the carrying base, in which its inner side facing the carrying base constitutes a lateral limit-stop face for a parcel being supported by the carrying base, said limit-stop face running at an angle of significantly less than 180°, preferably about 90–120°, to the upper side of the segment of the carrying base next to the side wall, and [said side wall can be] guided into a second position in which it no longer projects above the upper side of the carrying base so as to form a limit stop.

The essence [root idea] of the present invention therefore lies, to be sure, in providing for side walls at the longitudinal edges of the carrying base, said side walls, in the normal position of the carrying base, constituting lateral limit stops for each parcel being supported on the carrying base, but also in ensuring that at least that side wall, over whose respective longitudinal edge (of the carrying base) the parcel is to be laterally delivered when the carrying base is tilted, is arranged so as to be movable on the tilting-conveying element, in order to be able to move this side wall, when so required, into a second position, in which the carrying-base longitudinal edge in question has no limit stop. If the tilting-conveying element is one which can be tilted from its normal position to a slanted delivery position, alternatively, to one or the other side (viewed in the conveying direction, thus, either to the right or to the left), then it goes without saying that both side walls will be designed in this way to be movable in relation to the carrying base.

To keep a side wall that is designed and arranged according to the invention in its limit-stop position when the carrying base is in the non-tilted normal position, and to move it from this limit-stop position to its second position at a specified point in time (and at a later point in time to move it back to its limit-stop position), clearly the most varied design possibilities are available. Thus a side wall designed and arranged according to the invention can be connected, e.g., to the lower side of the carrying base, for example, by means of an externally controllable drive (for instance, a small electric motor or a piston cylinder unit), said carrying base, after receiving an appropriate control signal, moving the side wall from its limit-stop position to its second position, and, after receiving a further control signal, moving it back to its limit-stop position, these control signals being triggerable, optionally, by the tilting movement(s) of the carrying base, but also capable of being generated independently, the relative motion of the side wall with respect to the carrying base potentially occurring through a translational sliding of the side wall or a rotating motion with respect to the carrying base.

If only due to the associated expense, however, provision is preferably made for a movable side wall to be arranged on the tilting-conveying element such that, when the carrying base is tilted from its normal position to its delivery position (tilted end position), said side wall can be moved independently, i.e., specifically without a corresponding separate drive and without intervention from outside, to its second position, namely through a connecting means connected, on the one hand, to a side wall and, on the other hand, to a suitable part of the tilting-conveying element, said connecting means bringing it about that, when the carrying base is tilted, the side wall moves independently to its second position, and when the carrying base is tilted back to its normal position, it is moved back to its limit-stop position.

For this purpose, provision is preferably made for a side wall, movable with respect to the carrying base, to be hinge-mounted on the carrying base so as to swivel (to the outside) on a swivel pin, in or running parallel to the respective longitudinal edge of the carrying base by means of at least one frame joint hinge, or the like. In this context, it is preferable that the side wall be joined with articulation, with clearance from its swivel pin, to at least one guide rod running transversely to the side wall, said guide rod being joined with articulation at its other end on the tilting-conveying element with clearance from the tilting shaft, this guide rod functioning therefore as actuating element for the side wall, permitting the latter, when the carrying base is tilted, to move independently between its limit-stop position and its second position.

It is preferable that the guide rod be joined with articulation to an external extension [lug] of the side wall, at its first hinge point, associated with the side wall, said extension extending preferably below the lower side of the carrying base, the guide rod, in this context, being joined with articulation to the lower segment of the extension (i.e., even in the normal position of the carrying base, below the swivel pin). It is true, the guide rod's first hinge point, which is associated with the side wall, could in principle be located above the swivel pin even in the normal position, but such an arrangement is inexpedient particularly when the carrying base of the tilting-conveying element can alternatively be tilted to both sides, so that each of the two side walls associated with a longitudinal edge of the carrying base is provided with a corresponding guide rod arrangement, and care should be taken that the guide rod, pivoting upwards during a lateral tilting of the carrying base, neither collides with the carrying base nor impresses in the side wall associated with it a swivel path in the tilting direction. Since it is not only sensible and thus imperative, in all such cases, to design all the guide rods the same [way], but it moreover being imperative for cost reasons to design the guide rods identically even when the carrying base can be tilted only in one direction, given an otherwise identical design of the tilting-conveying element, it is expedient to choose the same guide rod arrangement for carrying bases that tilt only in one direction as for models that tilt to both sides.

In addition, it has proven to be expedient to join with articulation the guide rod associated with a movable side wall, at its second hinge point, facing away from the side wall, to a segment of the tilting-conveying element which is not tilted during a lateral tilting of the carrying base, indeed, preferably, on the side of the tilting-conveying element facing the side wall in question, since with such a design of the guide rods, the supporting structure supporting the carrying base of a tilting-conveying element does not have to "cross" with respect to the sorter-guiding device, and the guide rod can be mounted at any position on the side wall, whereas otherwise it has to be joined with articulation at its first hinge point, facing the side wall, or optionally at an end-side extension of the side wall, said extension extending to the inside from the respective longitudinal edge of the carrying base, between the tilting-conveying element and an adjacent tilting-conveying element, i.e., being arranged in the area of a transverse edge of the carrying base, so that the guide rod in question therefore extends between two tilting-conveying elements adjacent to each other, and care must be taken that the guide rod, in the horizontally curved segments of the sorter-conveying track, not collide with the tilting-conveying element adjacent to it.

In accordance with a preferred embodiment of the present invention, the guide rod of a movable side wall is designed and arranged such that its first hinge point, associated with this side wall, given a corresponding swivelling of the side wall, when the carrying base is tilted from its normal position in the direction of the side wall in question, is swivelled around its swivel pin in the same direction of rotation as the tilting motion of the carrying base, such that the inner side of the side wall facing the carrying base, at the latest in the end position of the carrying base, is aligned with the segment of the upper side of the carrying base adjacent to the side wall (or, alternatively, runs parallel thereto, displaced downwards), i.e., the side wall is moved from its limit-stop position to such a position relative to the carrying base in which it (=its inner side) extends the gliding surface of the carrying base (aligned with this), without obstructing the parcel in question during a lateral sliding from the carrying base.

Further preferred embodiments of the present invention are described in the dependent claims.

In this context, it should be mentioned once again that it is completely unimportant for the present invention, in what manner or by what means the carrying base at a delivery location is moved from its normal position to its tilted delivery position, and that it is only important that the carrying base of the sorter-conveying element can be tilted from its essentially horizontal normal position to a lateral delivery position, on a slant from the normal. In addition, it should be noted that the essentially planar carrying base can be designed, optionally, curved (rounded) and correspondingly rounded off [beveled], in order to center a loaded parcel as close to the middle as possible, while offering to the loaded parcel, in the final analysis, an essentially planar supporting surface on which the parcel can be supported during the conveying, and indeed for the very reason that a pronounced curvature or bending of the carrying base would lead, particularly during the handling of luggage pieces, to the tilting-conveying element being designed too high. Such a design of carrying bases might be expedient for parcels such as round timber, etc., to prevent their laterally rolling off the carrying base(s) supporting them, as provided in German Patent 1 226 041, the "carrying base" of a tilting-conveying element there comprising two pairs of arms, each forming an angle of about 135°, and one arm of each pair, extending downwards beyond the tilting shaft, being swivelled, at a delivery location, such that its upper side in the tilted end position is essentially aligned with the upper side of the other arm. In this case, however, we are obviously dealing with a sorter design which focusses on a special (i.e., half-way) tilting of a "carrying base" which is essentially not horizontal even in its normal position, and which, due to its configuration even in the normal position, does not require side walls on its longitudinal edges, since the parts of the tilting-conveying element designed as arms and constituting the carrying base already form a lateral limit stop for a parcel being transported by a tilting-conveying element, so that no supplemental limit stop is required to prevent a lateral sliding of a parcel taken onto the carrying base during the conveying, such as is provided on the longitudinal edges of a carrying base in a generic tilting-conveying element. Accordingly, German Patent 1 226 041 does not provide for any side walls on its lateral longitudinal edges either, so that this document does not teach one skilled in the art, how, optionally, to proceed with such side walls.

The preferred embodiments of the present invention are described in the dependent claims.

Figure 1:
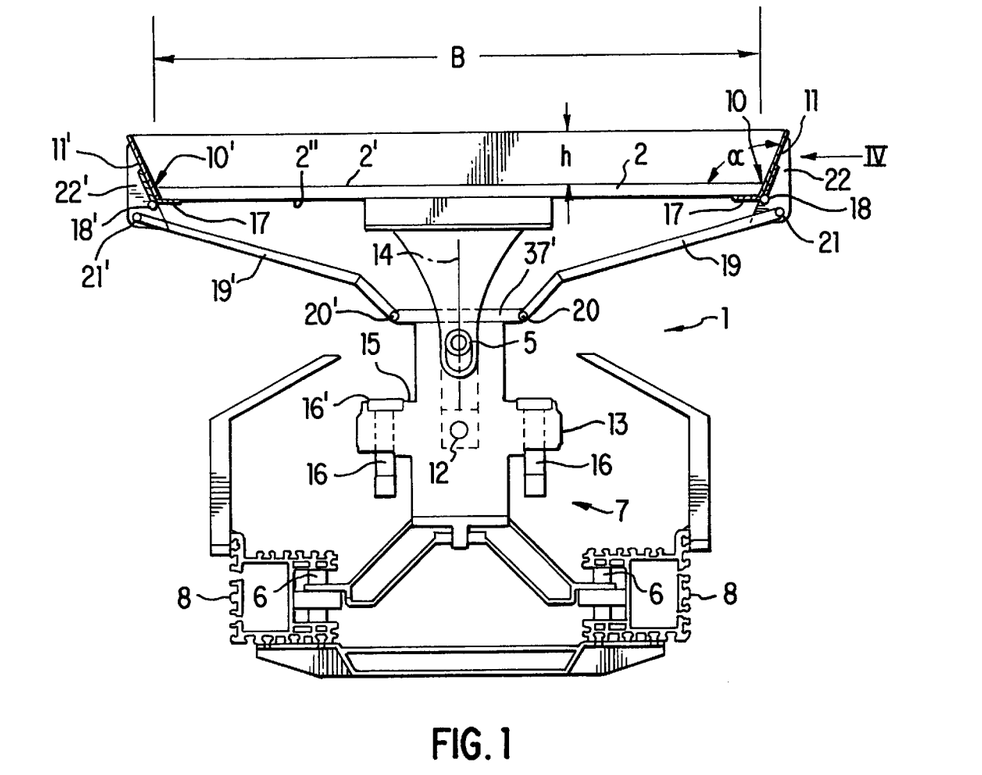
FIG. 1 a lateral plan view of a tilting-conveying element in accordance with the present invention in its untilted normal position, viewed in the direction of arrow I (see FIG. 5) in the conveying direction.

The invention is further explained below on the basis of an exemplary embodiment, with reference to a drawing. There are shown:

FIG. 1 shows a tilting-conveying element 1, designated in its entirety with 1, for a sorter-conveyor (sorter) for sorting parcels, as described in detail above.

Tilting-conveying element 1 has a planar carrying base 2 for receiving and supporting a parcel, not depicted, said carrying base being, optionally, also capable of being designed slightly curved or bent (downwards), [which would apply] indeed in its horizontal normal position, which carrying base 2 adopts during conveying outside of the delivery location at which the parcel received by carrying base 2 is to be delivered laterally.

Figure 2:
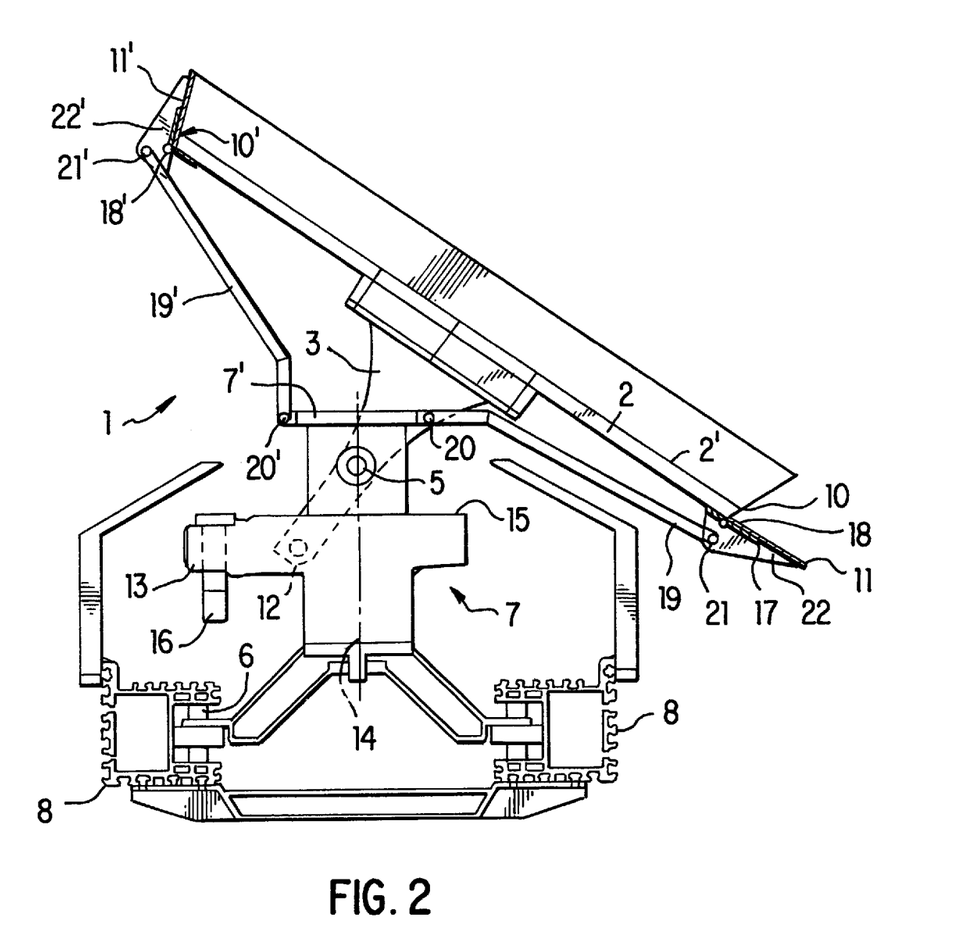
FIG. 2 the conveying element according to FIG. 1 in its delivery position, tilted to the right (viewed in the conveying direction)
Figure 3:
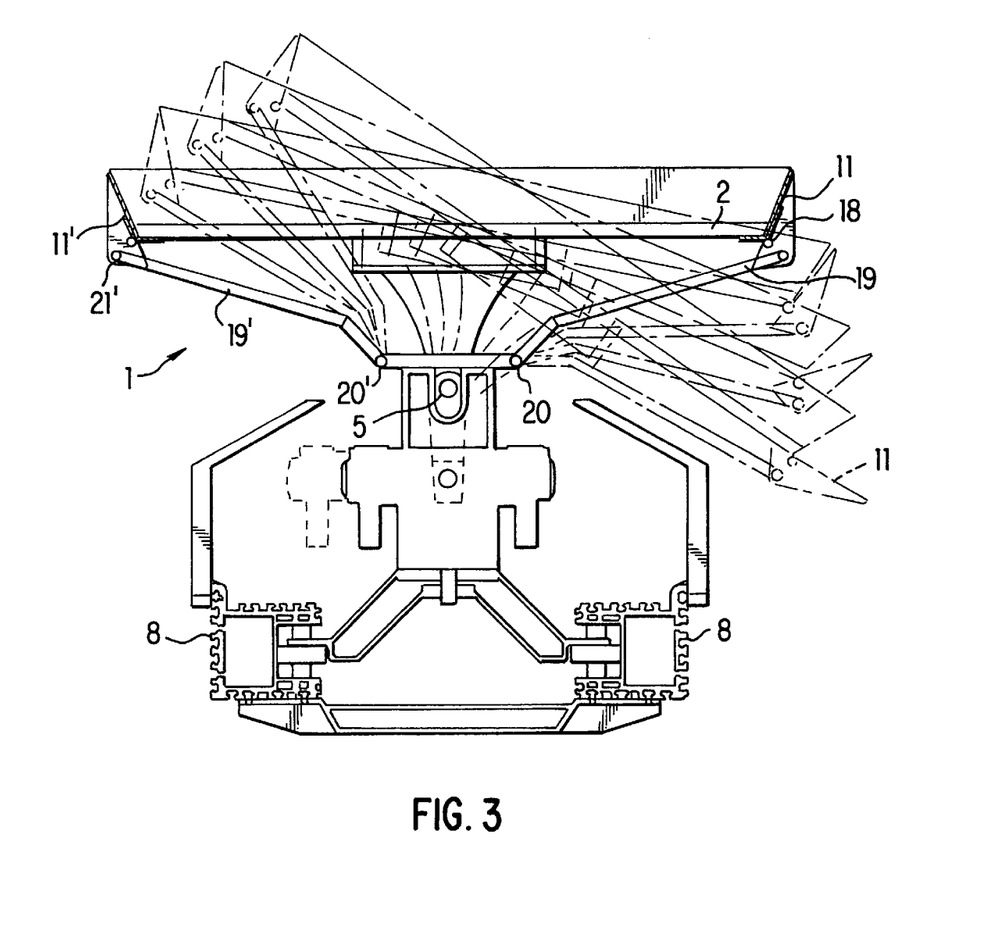
FIG. 3 the tilting-conveying element according to FIGS. 1 and 2 in its normal position (see FIG. 1), represented with solid lines in its tilted end position according to FIG. 2, and in two intermediate positions, represented with dotted lines.

Carrying base 2 is joined to a tilting shaft 5 by a column 3 centrally mounted on its lower side, [in order] to be able to tilt it to a slanted delivery position (see FIGS. 2,3). More precisely, carrying base 2 (along with column 3, which is fastened to it) may be tilted, alternatively, to the right (see FIGS. 2,3) or to the left (see FIG. 4).

Tilting-conveying element 1 is (as a conveying component) a constituent part (designed as a link conveyor) of a sorter-conveyor (sorter) for sorting parcels, not pictured, in particular luggage pieces, and has rollers 6, which are arranged, so as to turn, on a non-tiltable lower part 7 of tilting-conveying element 1, and are conveyed on a (continuous) sorter guiding device comprising two tracks 8 mounted parallel to each other, tilting-conveying element 1 being propelled along guiding device [tracks] 8 by means of a drive, not pictured. Tilting-conveying elements 1,1 adjacent to each other, are joined to each other with articulation at 9 (see FIG. 5), enabling them to follow guiding device 8.

Carrying base 2 is provided on each of its longitudinal edges with a side wall 11, 11', which, in the normal position of carrying base 2, pictured in FIG. 1, constitutes a lateral limit stop for the parcel supported by carrying base 2, and which, in the exemplary embodiment pictured, runs at an angle α of about 110° to upper side 2' of carrying base 2.

Although this is in itself unimportant for the present problem and its solution (in this context, it is only important that carrying base 2 is laterally tiltable around tilting shaft 5), it should be said that, in the exemplary embodiment pictured, column 3 continues downwards below tilting shaft 5 and is joined with articulation at its lower end segment, at 12, to a sliding component 13, which is guided, at a right angle to central axis 14 of tilting-conveying element 1, on a guide 15 of the lower part of tilting-conveying element 1, tilting-conveying element 1 being locked in its normal position, as pictured in FIG. 1, by locking pins 16, and being to a limited extent slidable transversely to central axis 14 of tilting-conveying element 1 by the action of an unlocking means, not pictured, acting transversely to central axis 14, with the simultaneous tilting of carrying base 2, as is described in detail in European Patent 0 664 262 A1, so that there is no need here for a detailed description of the initiation and completion of the tilting process, because this, as was explained, is not important in detail.

Side walls 11 and 11' are hinge-mounted around swivel pins 18 and 18', respectively, on carrying base 2, said swivel pins 18 and 18' running parallel to the side-wall-associated longitudinal edges 10 and 10', respectively, of carrying base 2, and being formed by a plurality of frame joints 17. In addition, side walls 11 and 11' are joined with articulation, with clearance from their respective swivel pins 18 and 18', to guide rods 19 and 19', respectively, running transversely to their respective swivel pins 18 and 18', said guide rods 19 and 19' being joined with articulation at their other ends, at 20 and 20', respectively, with clearance from tilting shaft 5, to tilting-conveying element 1. Specifically, each guide rod 19 and 19' is joined with articulation at its first hinge point 21 and 21', respectively, of the thereto-associated side wall 11 and 11', to an external extension 22 and 22', respectively, of the side wall 11 and 11' in question, or more precisely, to an extension 22 and 22' which extends to below the lower side 2" of carrying base 2, each guide rod 19 and 19' being joined at the lower segment of extension 22 and 22', respectively (i.e., below swivel pin 18 and 18', respectively), and guide rods 19 and 19' each being joined with articulation at their second hinge point 20 and 20', respectively, facing away from the associated side wall 11 and 11', respectively, to a lower segment 7' of tilting-conveying element 1, said lower segment 7', during the lateral tilting, not being tilted along with carrying base 2, namely, at a location which is facing the side wall 11 or 11' in question.

The precise relative arrangements of both the first and second hinge points 21,21' and 20,20' of guide rods 19,19' with regard to extensions 22 and 22', respectively, on the non-tiltable lower part 7 are difficult to specify in general (i.e., for every possible application case) due to the diverse parameters. However, if the distance of swivel pins 18 and 18', respectively, to central axis 14 is fixed, based on the predetermined width of the carrying base, and also [if] the distance of tilting shaft 5 to carrying base 2 is preselected, and the design of side walls 11,11' is determined, then an appropriate guide rod arrangement with respect to its hinge points 21 and 21' as well as 20 and 20', respectively, can be iteratively determined with relative ease. After a preliminary choice of first hinge point 21 and 21' under the prescribed conditions, and considering the circumstance that the clearance of first hinge point 21 and 21' of guide rod 19 and 19', respectively, must remain constant during the swivelling of side walls 11 and 11' about swivel pin 18 and 18', respectively, and that its swivel angle (180°-α) in this context is predetermined, then the appropriate location for second hinge point 20 and 20' of guide rod 19 and 19', respectively, may be found relatively rapidly, optionally assuming that the previously prescribed location of first hinge point 21 and 21' may be altered, and this is so even when carrying base 2 is tiltable not only to one side (i.e., either to the right or to the left), but rather to both sides, and accordingly, care must additionally be taken that guide rod 19 and 19', associated with side wall 11 and 11', respectively, not exercise any intolerable force upon side wall 11 and 11' associated with it, when carrying base 2 is tilted laterally to the opposite side. For tilting-conveying elements 1 whose carrying base 2 is alternatively tiltable (in the conveying direction) to the right or to the left, this creates an additional condition for the design of guide rods 19,19' and their hinge points 20,21 and 20',21', respectively, but even this additional condition may be met without great difficulty through iterative steps in the selection of first hinge point 21 and 21' and second hinge point 20 and 20', if the distances of swivel pin 18 and 18', respectively, to central axis 14 of tilting-conveying element 1, and of tilting shaft 5 to the respective swivel pin 18 and 18' are known. If the technical designer determines in these stipulations that a guide rod arrangement which has been worked out indeed satisfies the condition that, during the tilting of conveying element 1, the side wall which has swivelled downwards in the tilt direction of carrying base 2 has been swivelled to the outside by the guide rod at the desired angle relative to carrying base 2, the guide rod associated with the other side wall, however, being induced in this context to produce a swivel motion of the side wall associated with it in the tilt direction of carrying base 2, he simply needs to ensure, by altering first hinge point 21 and 21' relative to swivel pin 18 and 18', respectively, and/or by altering second hinge point 20 and 20' relative to tilting shaft 5, that, in the swivelling of a guide rod 19 and 19' upwards, based on a corresponding tilting motion of carrying base 2, it no longer happens that first hinge point 21 and 21' is swivelled about swivel pin 18 and 18' of side wall 11 and 11' in question in the tilting direction of carrying base 2, but rather that first hinge point 21 and 21' in this context is swiveled either not at all or opposite to the tilt direction of carrying base 2. The latter is not critical because, during a corresponding tilting of carrying base 2, resulting in a lateral sliding [of the parcel] from carrying base 2 to the opposite side, the side wall in question does not have to exert any limit stop effect on the relevant parcel, so that it is to that extent unimportant whether, during the tilting of carrying base 2, this side wall still remains in its limit-stop position or is swivelled away to the outside. It is only essential that, during a corresponding tilting of carrying base 2 in the direction of the opposite longitudinal edge 10 and 10' of carrying base 2, guide rod 19 and 19', respectively, associated with this side wall, not impart to the latter any swivelling motion in the direction of the tilting motion of carrying base 2. However, such a guide rod arrangement, as was already explained, may be worked out without particular difficulty through iterative steps in the determination of first and/or second hinge points 21,21' and 20,20' of guide rod 19 and 19', respectively, if the parameters already indicated are known and it is also known that the one side wall 11 or 11', (at the latest) in the tilted end position of carrying base 2, is to be moved by means of guide rod 19 and 19' associated with it from its limit-stop position to a (second) position in which it is essentially aligned with carrying base 2.

Also in the exemplary embodiment pictured in the drawing for a generic tilting-conveying element 1 having a planar carrying base 2 which is horizontal in its normal position, its width B, and therefore, the distance of longitudinal edges 10,10' from central axis 14 are clearly stipulated, as is the distance of tilting shaft 5 from carrying base 2, as well as the design of side walls 11,11' and their arrangement relative to carrying base 2. In the exemplary embodiment depicted, they are each placed at an angle a of about 110° to upper side 2' of carrying base 2. If the technical designer opts for the most preferred embodiment, in which side walls 11,11' are each joined to carrying base 2 so as to swivel to the outside, swivel pins 18,18' are, or can be, stipulated accordingly. In so doing, the technical designer also knows the tilted end positions of carrying base 2 on both sides and the positions, prescribed for him there, of side walls 11,11', respectively, relative to carrying base 2, and, in light of what is expedient from the point of view of design, he can therefore determine [the location of] first hinge points 21,21' for guide rods 19,19', [which are] to be joined with articulation to side walls 11,11' (temporarily) with their respective distances to the respective swivel pins 18,18', such that the overall width of the carrying basin, formed by carrying base 2 and side walls 11,11', is not increased, as far as possible. In so doing, already from this point of view, he arrives at the [location of] first hinge points 21,21', which expediently are positioned more or less below the respective swivel pin 18 and 18', and he can now select the temporary second hinge points 20,20' on the basis of the otherwise fixed design relationships with a clearance to tilting axis 5, said second hinge points 20,20' fulfilling the condition that their respective distance to first hinge point 21 and 21' associated with them is the same in both tilted end positions of the carrying base as it is in its normal position. In this context, if second hinge points 20,20', having been worked out, are placed unfavorably with respect to the remaining design of tilting-conveying element 1, then it is possible to find a suitable guide rod arrangement through correction of first hinge point 21,21' or after trial and error in iterative steps.

In the exemplary embodiment depicted, carrying base 2, which is joined with articulation via column 3 to non-tiltable lower part 7 of tilting-conveying element 1 by means of tilting shaft 5, is locked in its normal position (FIG. 1) by locking pins 16. At an undepicted delivery location, an undepicted unlocking means having a camshaft makes contact from below with locking pin 16 facing it, elevates the latter in the process of unlocking the carrying base, and guides its head 16' into a switching device, likewise undepicted and designed as a bar curved to the outside, which causes sliding component 13 to be pushed to the corresponding side (see FIG. 2, in which, however, this switching device is not depicted), so that carrying base 2 along with column 3 which is fixedly mounted on it is tilted to the opposite side about tilting shaft 5 (see FIGS. 2,3), said tilting shaft 5, in this exemplary embodiment, being slightly lowered, all of which is described in detail in European Patent 664 262 A1, to which reference is expressly made here. Since, however, the present invention does not concern the specific manner of initiating and carrying through the tilting procedure, an exact description of the details in this regard may be omitted.

In the tilting of carrying base 2 to the right (see FIGS. 2,3) around tilting shaft 5 (which is slightly lowered in the process), every point of the carrying base and of the parts joined to it are moved with a corresponding distance from tilting shaft 5 around a circular arc about tilting shaft 5. The same applies to side walls 11,11' which are joined to carrying base 2 and to its extensions 22,22' and therefore also to first hinge point 21,21', respectively. However, since the latter are each joined with articulation through a guide rod 19 and 19', respectively, to non-tilting lower part 7 of tilting-conveying element 1 so that their respective distances to second hinge point 20,20', respectively, must remain constant and [so that] this distance, when side wall 11 is lowered during the lateral tilting of carrying base 2, is smaller than the distance of first hinge point 21 to tilting shaft 5, first hinge point 21, in the process of a corresponding swivelling of the lowered side wall 11, is moved towards the center of tilting-conveying element 1 though swivelling around swivel pin 18, this occurring until the inner side of the lowered side wall 11, in the tilted end position of carrying base 2, is aligned, with a slight displacement, with upper side 2' of the carrying base at its height.

On the other hand, the side wall which is tilted upwards (see FIGS. 2,3) in the process of the tilting of carrying base 2 is not swivelled, since, in so doing, the arc described by its first hinge point 21' around second hinge point 20' essentially coincides with the circular arc which it [the side wall] describes in the raising of guide rod 19' around tilting shaft 5.

FIG. 3 once again shows tilting conveying element 1 in the normal position of carrying base 2, using solid lines as in FIG. 1, and in addition, [shows] with dotted lines a plurality of phases of the tilting procedure up to attaining the tilted end position, also indicated in FIG. 3 with dotted lines. It is discernible how side wall 11, which is lowered during tilting, is successively tilted to the outside from its upright limit-stop position in the normal position of carrying base 2, whereas side wall 11', which is elevated during the tilting procedure, in this context remains in the position relative to carrying base 2 which was already present in the normal position.

Figure 4:
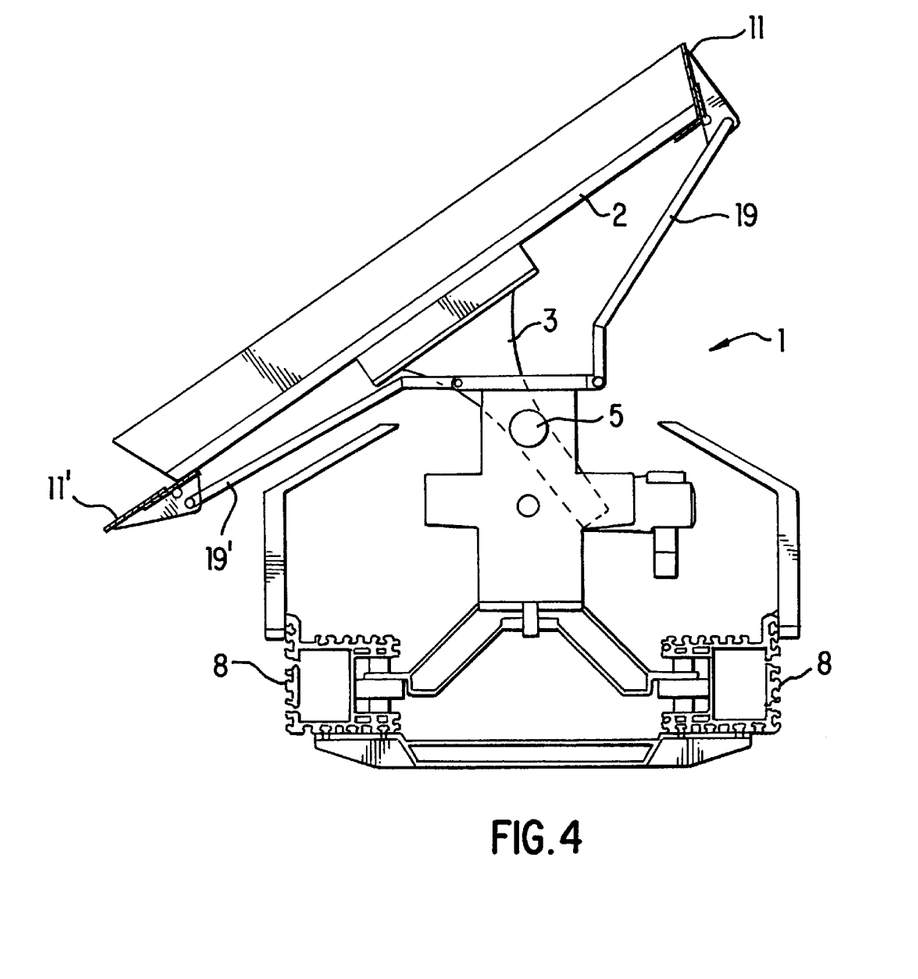
FIG. 4 the tilting-conveying element according to FIGS. 1–3 in a tilted end position, tilted to the left (viewed in the conveying direction)

As FIG. 4 shows, corresponding circumstances result when carrying base 2 is tilted, instead, to the other side (i.e., in FIG. 4, to the left).

Figure 5:
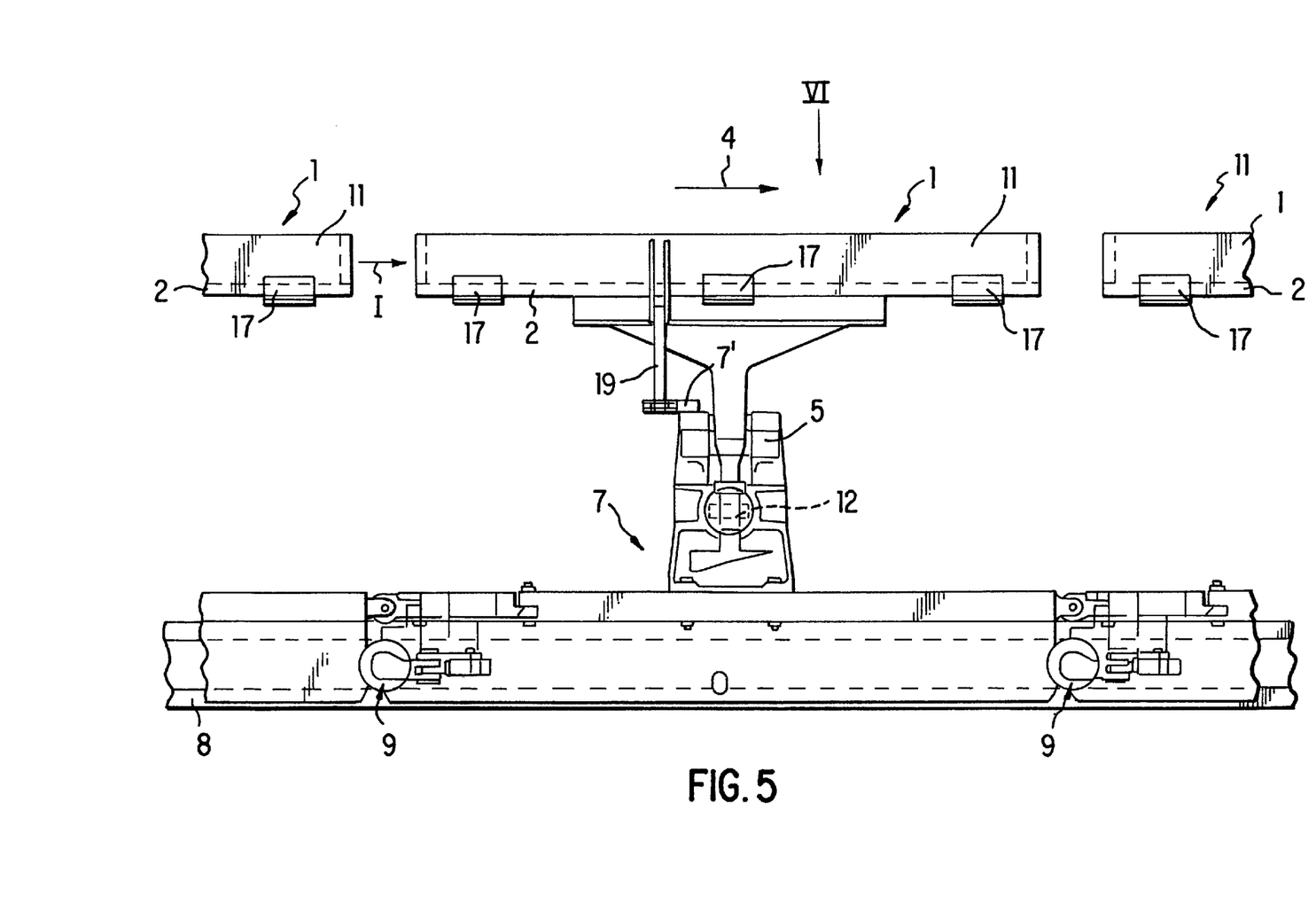
FIG. 5 a lateral plan view of a section of the sorter-conveyor path in the direction of arrow V in FIG. 1.
Figure 6:
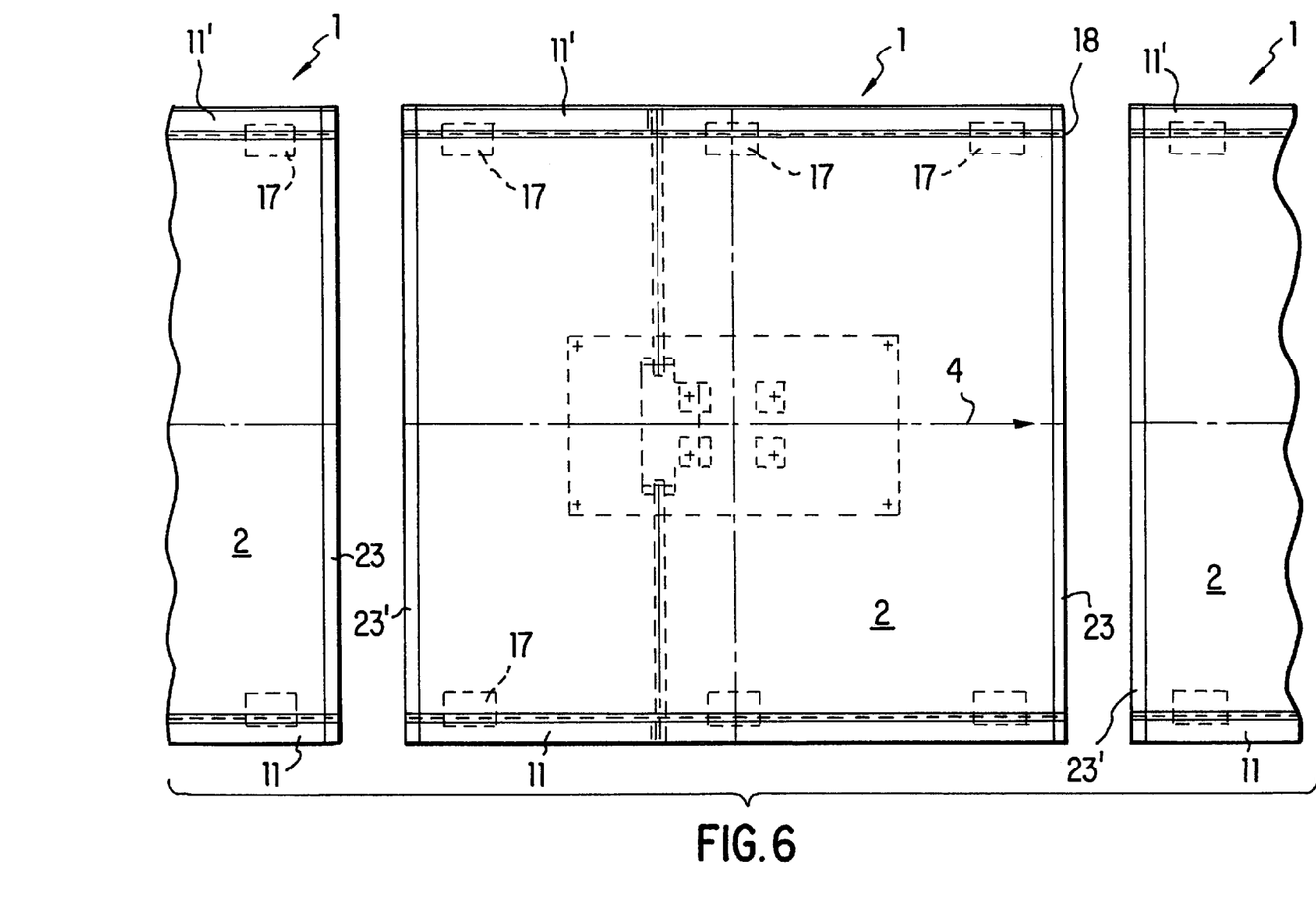
FIG. 6 a plan view of the depiction according to FIG. 5 viewed in the direction of arrow VI in FIG. 5.

FIG. 5 shows a partial side view of a sorter viewed in the direction of arrow V in FIG. 1, more precisely, a complete tilting-conveying element 1 as well as the two adjacent upstream and downstream tilting-conveying elements 1, which are each connected one to another with articulated connections 9 in the area of tracks 8, and FIG. 6 shows a top view of the depiction according to FIG. 5 seen in the direction of arrow VI in FIG. 5, leaving out tracks 8 and the parts of tilting-conveying element 1 which are directly guided there [on the tracks]. It is discernible that, apart from side walls 11,11', a fixed transverse wall is arranged on each of the transverse edges of carrying base 2, so that carrying base 2 of every tilting-conveying element 1, together with side walls 11,11' and transverse walls 23,23', forms a box-shaped container, in the normal position, the height h of the walls 11,11', 23,23' above carrying base 2, being potentially significantly higher than is shown in the exemplary embodiment.

Figure 7:
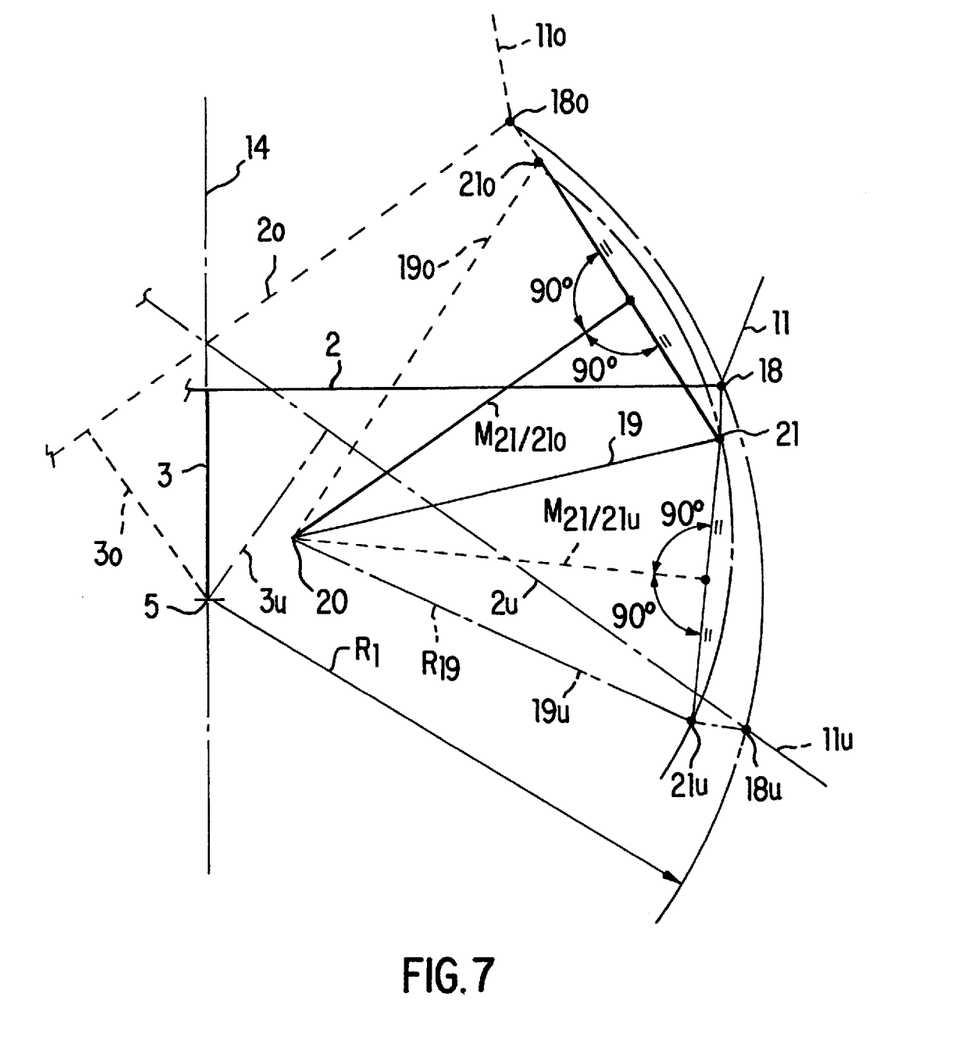
FIG. 7 a depiction of the geometric relationships on the right side of the central axis, showing how the location of the second hinge point of a side wall may be determined.

With reference to FIG. 7, it should be additionally explained, how the location of second hinge point 20 and 20' of a side wall 11 and 11', respectively, arranged on a fixed segment of tilting-conveying element 1 has been, or can be, determined. In this context, FIG. 7 shows, as do FIGS. 1–4, a cross-section depiction of the right side. The reference numerals correspond to the preceding and succeeding related reference numerals, the subscript "o," however, having been added to certain elements or points in the upper portion, the subscript "u" in the lower portion. It is immediately discernible that the location of second hinge point 20 of side wall 11, associated with it, and of its guide rod 19, is determined by the intersection, on the one hand, of mid-vertical $M21/21_o$ on connecting line $21–21_o$ between the first hinge point in its normal position 21 and its uppermost position $21_o$, and, on the other hand, of mid-vertical $M21/21_u$ on connecting line $21–21_u$ between the first hinge point in its initial location 21 and in its lowermost position $21_u$. The same naturally applies to second hinge point 20' of guide rod 19'.

In conclusion, it may be asserted that with the movable arrangement of side walls on a tilting-conveying element 1 the possibility is created of using container-shaped carrying elements without thereby hindering the delivery of a parcel supported by carrying base 2 to the respective delivery location, it being possible to mount and to actuate side wall 11 and 11' arranged relative to carrying base 2 in the most various ways on tilting-conveying element 1, and it is particularly expedient if it is arranged such that, during a corresponding tilting of carrying base 2, it is independently moved from its limit-stop position into a position in which it does not impede a parcel which is laterally sliding from carrying base 2, without requiring a particular actuation and an intervention from outside for this purpose.

| List of Reference Numerals | |
|---|---|
| 1 | tilting-conveying element |
| 2 | carrying base (of 1) |
| 2' | upper side (of 2) |
| 2" | lower side (of 2) |
| 3 | column |
| 4 | conveying device |
| 5 | tilting shaft |
| 6 | rollers (of 1) |
| 7 | (non-tiltable) lower part (of 1) |
| 8 | tracks (= conveyance for 1) |
| 9 | articulated connection |
| 10,10' | longitudinal edges (of 2) |
| 11,11' | side wall |
| 12 | hinge point |
| 13 | sliding component |
| 14 | central axis (of 1) |
| 15 | guide |
| 16 | locking pins |
| 16' | head (of 16) |
| 17 | frame hinge |
| 18,18' | swivel pin |
| 19,19' | guide rod |
| 20,20' | second hinge point (of 19 and 19' on 22 and 22' respectively) |
| 21,21' | first hinge point (of 19 and 19' on 7') |
| 22,22' | extension (on 11 and 11', respectively) |
| 23,23' | transverse wall |

What is claimed is:

1. A tilting-conveying element for a sorter-conveyer for sorting parcels, particularly luggage pieces, comprising a planar carrying base which can be tilted from a horizontal normal position around a tilting shaft running in a longitudinal direction to at least a slanted delivery position, and at each of a plurality of longitudinal edges of said carrying base, said edges running essentially in the longitudinal direction, a side wall is arranged to define a lateral limit stop position in the normal position of the carrying base; said side wall being movably mounted on the tilting-conveying element relative to said carrying base such that said side wall can be moved from the limit-stop position to a second position in which said side wall no longer protrudes over an upper surface of the carrying base, said side wall mounted to said carrying base via a swivel pin having a swivel axis parallel to a longitudinal edge of said carrying base, and said movably mounted side wall is arranged at said tilting-conveying element such that, when said carrying base is tilted out of the normal position to the delivery position, said side wall becomes automatically moved to the second position by a connecting means arranged between said side wall and the tilting-conveying element.

2. The tilting-conveying element of claim 1, wherein said side wall is joined with articulation at a distance from the swivel pin to a first end of a guide rod running transversely to the swivel pin, said guide rod being joined with articulation at a second end to the tilting-conveying element, said guide rod having a first hinge point at said first end, and a second hinge point at said second end.

3. The tilting-conveying element as defined by claim 2, wherein said guide rod, at said first hinge point, is joined with articulation to an external extension of said side wall.

4. The tilting-conveying element as defined by claim 3, wherein said extension extends to below a lower side of said carrying base, and said guide rod is joined with articulation at a lower segment of said extension.

5. The tilting-conveying element as defined by claim 2, wherein said guide rod is joined with articulation at said second hinge point and faces away from said side wall to a segment of the tilting-conveying element, which during a lateral tilting of said carrying base, is not tilted along with said carrying base.

6. The tilting-conveying element as defined by claim 3, wherein said second hinge point of the guide rod is arranged on the side of the tilting-conveying element facing the respective side wall.

7. The tilting-conveying element as defined by claim 1, wherein said second hinge point of said guide rod is arranged above said tilting shaft.

8. The tilting-conveying element as defined by claim 2, wherein said guide rod is designed and arranged such that, when said carrying base is tilted from its normal position in the direction of said side wall, said first hinge point is swivelled relative to said carrying base around said swivel pin in a direction of rotation matching the tilting motion of said carrying base, such that an inner side of said side wall faces said carrying base and is aligned with a segment of an upper side of said carrying base adjacent to the side wall or, optionally, runs parallel to the latter, displaced downwards.

9. The tilting-conveying element as defined by claim 2, whose carrying base can be tilted, alternatively, to both sides around the tilting shaft, wherein said guide rod is designed and arranged such that, when said carrying base is laterally tilted from its normal position in the direction of a side opposite said guide rod, said guide rod's first hinge point is not swivelled relative to said carrying base, nor is said guide rod's first hinge point swivelled contrary to the tilting direction.

10. The tilting-conveying element as defined by claim 7, wherein said hinge points of said guide rod are arranged relative to each other as well as relative to said tilting shaft and to said swivel pin such that, when the tilting procedure of said carrying base triggers a swivelling in an upwards direction of said guide rod around its second hinge point said first hinge point is moved in a circular arc around said second hinge point, said circular arc essentially coinciding with a circle around said tilting shaft, in the area of the path of movement of said first hinge point between its position in the normal position of said carrying base and its highest position in the tilted end position of said carrying base, the radius of said circular arc being determined by the distance of said tilting shaft to said first hinge point in the normal position of said carrying base.

11. The tilting-conveying element as defined by claim 8, wherein said hinge points of said guide rod said tilting shaft, and said swivel pin of each guide rod are arranged in relation to each other such that, when a swiveling-down of said guide rod is triggered by the tilting action of said carrying base around its second hinge point, said first hinge point is moved in a circular arc around said second hinge point, said circular arc lying in the area of the path of motion of said first hinge point within the circle around said tilting shaft having the radius which is determined by a distance of said tilting shaft to said first hinge point in the normal position of said carrying base.

12. The tilting-conveying element as defined by claim 3, wherein the location of said second hinge point arranged on a fixed segment of said tilting-conveying element is determined by an intersection of a mid-vertical on a connecting line between said first hinge point in its normal position and in its highest position, and, on the other hand, a mid-vertical on a connecting line between said first hinge point in its normal position and in its lowest position.

* * * * *